July 4, 1950  C. S. FOGWELL  2,513,855
TRAILER

Filed May 13, 1947  3 Sheets-Sheet 1

Inventor
Charles S. Fogwell

By Clarence A. O'Brien
and Harvey B. Jacobson
Attorneys

July 4, 1950

C. S. FOGWELL 2,513,855

TRAILER

Filed May 13, 1947

Inventor
Charles S. Fogwell

By Clarence A. O'Brien
and Harvey B. Jacobson
Attorneys

July 4, 1950     C. S. FOGWELL     2,513,855
TRAILER
Filed May 13, 1947     3 Sheets-Sheet 3
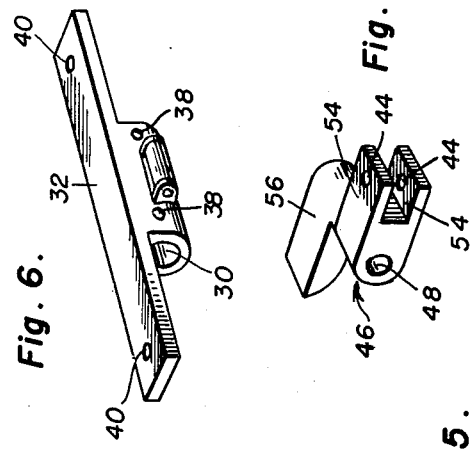
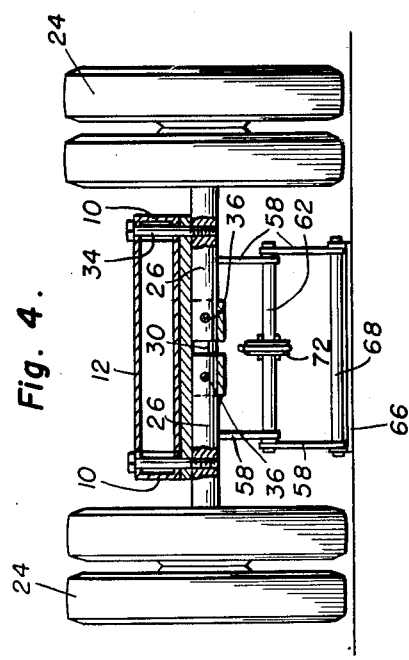
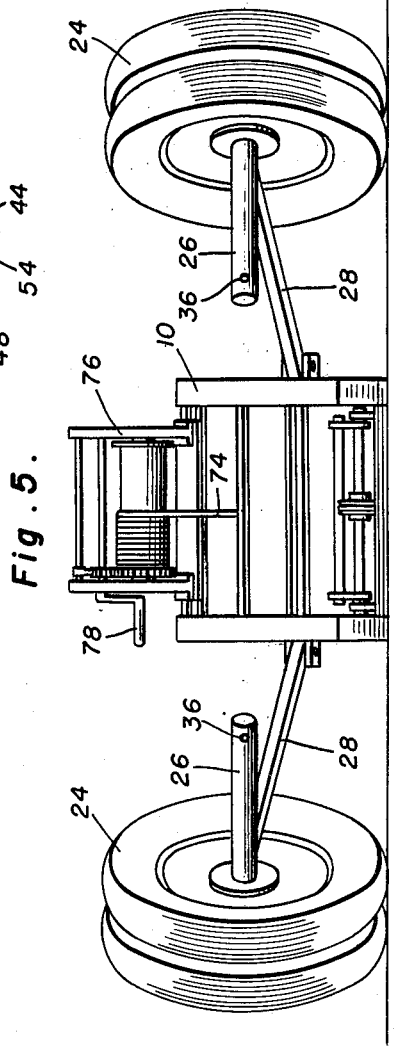
Inventor
Charles S. Fogwell
By Clarence A. O'Brien
and Harvey B. Jacobson
Attorneys Patented July 4, 1950

2,513,855

UNITED STATES PATENT OFFICE 2,513,855

TRAILER

Charles S. Fogwell, Phoenix, Ariz.

Application May 13, 1947, Serial No. 747,710

8 Claims. (Cl. 214—85)

This invention comprises novel and useful improvements in a trailer and more specifically pertains to a vehicle trailer wherein the rear end thereof may be elevated or lowered to the ground to facilitate loading thereof.

The principal purpose of this invention is to provide a trailer wherein the rear end thereof may be depressed to the ground without altering the elevation of the front end, in order to facilitate loading and unloading of the same.

An additional object of the invention is to provide an improved construction of running gear for a trailer wherein the trailer axles may be released from the trailer frame to permit lowering of the end of the trailer to the ground as desired.

A further important object of the invention resides in providing a novel and improved construction of jack attached to the rear frame of a trailer for selectively elevating and lowering the same as desired.

A still further object of the invention is to provide an improved operating means mounted upon the front end of a trailer for operating a jack mounted at the rear end thereof.

These, together with various ancillary objects of the invention which will later become apparent as the following description proceeds, are attained by this device, a preferred embodiment of which has been illustrated, merely by way of example, in the accompanying drawings, wherein:

Figure 4 is a transverse sectional view on line 4—4 of Figure 1 showing the trailer wheels elevated from the ground;

Figure 5 is a rear elevational view of the trailer in its lowered position, taken from the rear end of Figure 2;

Figure 6 is a perspective view of the axle supporting means of the trailer; and

Figure 7 is a perspective view of an element of the invention.

Referring now more specifically to the accompanying drawings, wherein like numerals indicate similar parts throughout the various views, the numeral 10 designates the side frame members or bed of a vehicle trailer which may be of any suitable construction and which is adapted for engagement at its front end with a motor vehicle, not shown. The bed of the trailer includes a flooring indicated at 12 and transversely disposed members 14 serving to give rigidity to the construction.

Figure 2:
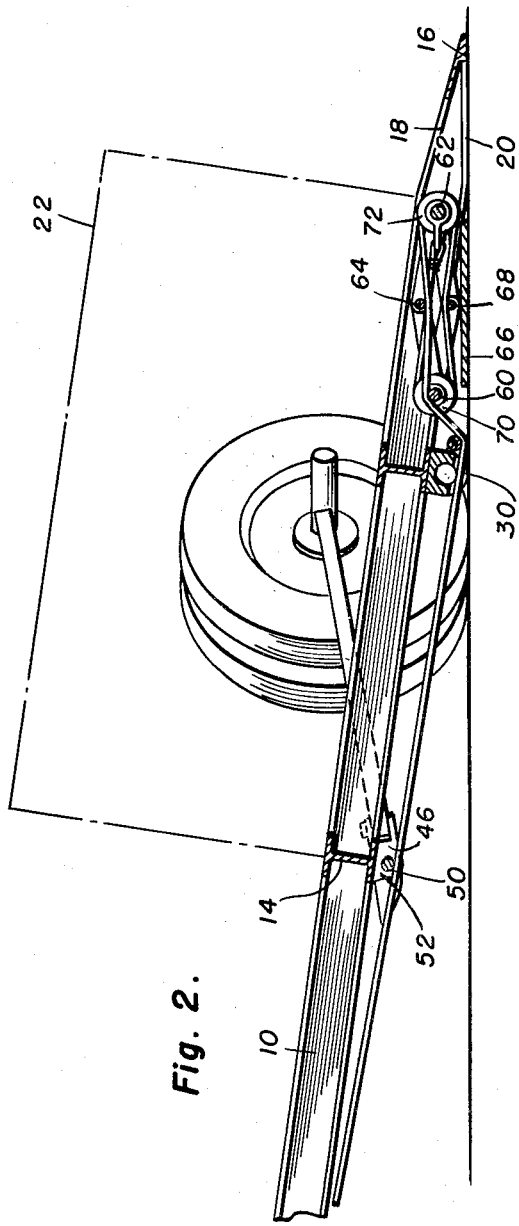
Figure 2 is a longitudinal sectional view similar to Figure 1, but showing the trailer wheels disengaged from the trailer frame, and the jack collapsed to permit the lowering of the rear end of the trailer frame to the ground.
Figure 3:
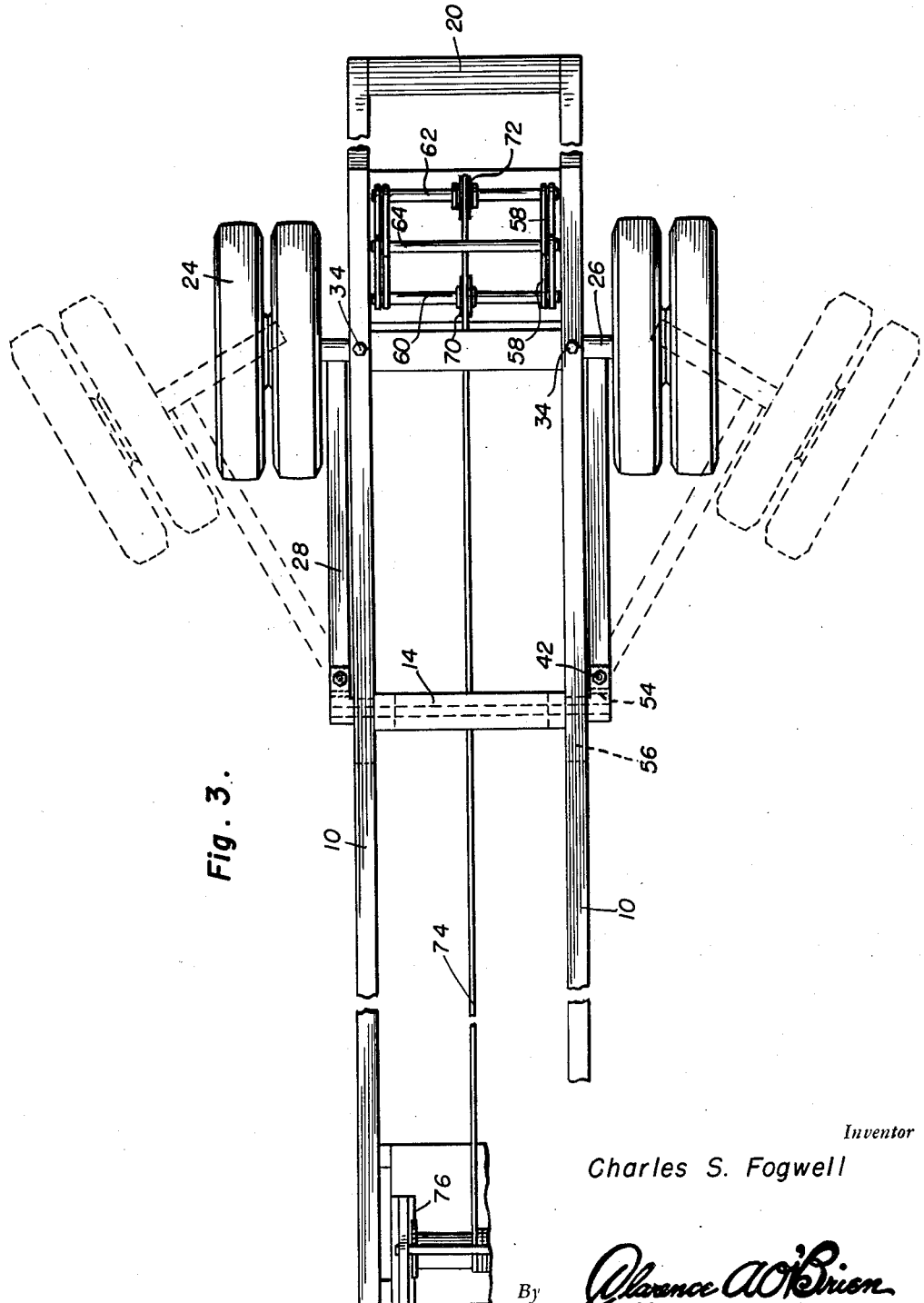
Figure 3 is a top plan view of Figure 1, the alternative position of the trailer wheels being shown in dotted lines thereon.

The rear end of the trailer frame is preferably formed with a wedge-shaped point 16 from which upper and lower inclined surfaces 18 and 20 merge with the upper and lower surfaces of the trailer bed to facilitate loading or unloading of the trailer when the rear end thereof is depressed and resting upon the ground as shown in Figure 2. As indicated in dotted lines at 22 in Figure 2, any suitable housing or other body may be formed upon the trailer as desired. The trailer frame is supported by a pair of oppositely alined wheel units indicated at 24 which units are journaled upon a stub axle 26 rigidly carried upon a supporting arm 28 pivotally secured to the frame. As will be readily understood, the wheel units 24 may consist of one or a plurality of wheels, of any suitable construction but illustrated as consisting of pneumatic tires. The stub axles 26 are preferably rigidly connected and extend laterally from and are supported by the arm 28. The stub axles 26 are adapted to be detachably received in the opposite ends of a bore 30 formed in a transversely disposed axle support or saddle 32 secured to the undersurface of one of the transverse frame members 14 as at 34. Alined bores 36 and 38 in the stub axles 26 and in the transverse cylindrical member 32 are provided for the reception of bolts or pins, not shown, for locking the stub axles in position within the bore 30. As shown at 40, the transverse member 32 is provided with suitable apertures receiving the above mentioned bolts 34.

Figure 1:
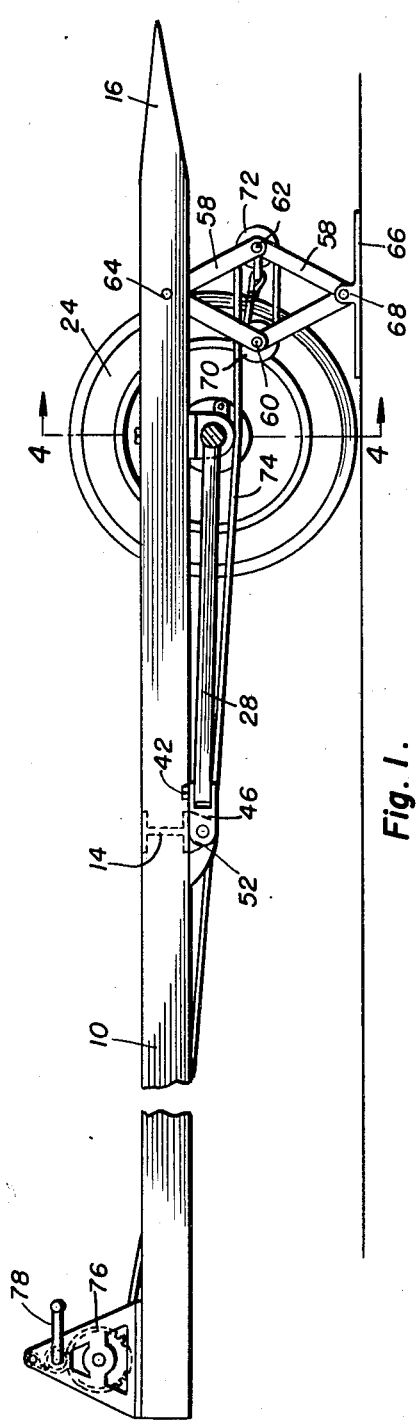
Figure 1 is a side elevational view of a trailer showing the principles of the invention applied thereto, the jack being disclosed in its elevated position for raising the trailer wheels from the ground.

As shown best in Figures 1 and 2, the arms 28 which carry the stub axles at their rear extremities are pivoted at their forward extremities by means of a vertically disposed pivot pin or axle 42 extending through apertures 44 in a bracket member 46, the arms 28 being mounted for lateral oscillation in the horizontal plane upon the pivot pin 42. As will be noted by reference to Figure 7, the bracket 46 is provided with a laterally extending bore 48 intermediate its extremities by means of which the bracket is journaled upon a pin 50 extending laterally of and being carried by a depending lug 52 beneath the frame 10 of the trailer. It will be noted that the bracket is thereby mounted for vertical oscillation about the laterally or horizontally extending pivot pin 48, while the arm 28 is mounted for lateral oscillation about the pivot pin 42 which extends vertically through the bifurcation 54 at the rear end of the bracket 46. At its forward end, the bracket 46 is provided with a lug or stop 56 which, as shown in Figure 7, is laterally offset from the bifurcated portion 54.

The bracket 46 is mounted upon the laterally extending pivot pin 50 of the depending lug 52 in such manner that the rear, bifurcated portions 54 of the bracket are positioned outside or laterally spaced from the side frame members 10, while the forwardly extending lugs 56 of the bracket is positioned to underlie the bottom surface of the corresponding side frame members 10.

This arrangement is such, that as shown in Figures 1 and 2, the upper surface of the lugs 56 are adapted to engage the undersurface of the side frame members, and thereby prevent downward movement of the arms 28, the stub axles 26 and the wheel units 24 when the frame is elevated above the ground. However, upward movement of these members relative to the frame is permitted in order that the frame may be lowered to engage the ground as shown in Figure 2, and for this purpose the bracket 46 is pivotable in a counter-clockwise direction about the pivot 50, the lug 56 being retracted from the undersurface of the frame members 10 during this operation.

As will now be readily apparent, it is merely necessary to move the stub axles and wheel units laterally from the frame, as shown in Figure 5, whereby the frame may be lowered until it contacts the ground as shown in Figure 2. Obviously, upon raising the frame, the wheel units may be again swung into their assembled position with the stub axles being received in the transverse bore 30 of the axle retaining member 32, whereupon the trailer is in assembled position and its load may be now carried by the axle members.

In order to facilitate the raising or lowering of the trailer frame as required, either for the purpose of detaching the axle member or for other uses as desired, a jack is mounted in depending relation from the rear ends of the frame and to the rear of the axle members. As shown best in Figures 1 and 4, the jack may conveniently be formed of two laterally displaced and positioned series of links 58, these links being connected to each other in pairs by laterally extending rods 60 and 62, and to each other and to the frame 10 at their upper ends by a similar rod 64 and at their lower ends to a base plate 66 by a rod 68. As shown in Figures 1 and 2, these links, together with their laterally extending pivot rods constitute a parallelogram or toggle and the intermediate shafts 60 and 62 are provided with pulleys 70 and 72. A flexible cable or chain 74 is secured to the pivot rod 62 and thence entrained over the pulleys 70 and 72 and then forwardly under the trailer frame 10 to a windlass indicated generally at 76 and provided with a manual operating means 78, or with a power operated winch.

The construction is such that by proper operation of the windlass the cable may be reeled in causing the pulleys 70 and 72 and thereby the pivot pins 60 and 62 to be drawn together, thereby elevating the toggle links and causing the jack to raise the trailer frame from the ground as shown in Figure 1. In this position, the fastening means may be removed from the retaining holes 36 and 38, the stub axles 26 withdrawn from their axle sockets 30, and the wheel units shifted laterally of the frame 10. As the cable is now thrown out by the windlass 76, the weight of the trailer frame causes the toggle link to collapse into the position shown in Figure 2, whereupon the trailer frame at its rear end is supported upon the ground. In this position, the trailer forms an incline by which it may be easily loaded or unloaded as desired. It should be here noted that this operation of the trailer is possible even though the front end of the same has been coupled to a towing vehicle, thereby facilitating loading and unloading of the same without involving the labor of coupling and uncoupling the trailer. The jack being located at the rear end of the trailer has the advantage of a longer lever arm and thereby may be of lighter construction than if located intermediate the frame of the trailer. The transverse member 32 is provided with a cylindrically shaped transversely extending portion within which is received the bore 30, to thereby provide greater clearance with the ground when the trailer is in its lowered or collapsed position as shown in Figure 2.

Obviously, various modifications will be readily apparent to those skilled in the art after a consideration of the foregoing specification and attached drawings, and accordingly, it is not desired to limit the invention to the exact construction shown and described. Accordingly, all suitable modifications may be resorted to falling within the scope of the appended claims.

What is claimed as novel and improved is:

1. In a vehicle trailer, a frame having longitudinally extending side members interconnected by transversely extending bars, wheels journaled on stub axles, longitudinally extending arms secured to said stub axles, means for selectively fastening said stub axles in journaling engagement upon said frame, and means for pivoting said arms upon said frame for movement laterally and vertically of said frame, said latter means comprising apertured lugs depending from one of said transverse bars, a transverse pin extending through said lugs, brackets journaled at the extremities of said pin, each bracket having spaced apertured ears, means for retaining said arms between said ears for horizontal pivotal movement on said brackets, and means carried by said bracket for limiting the downward movement of said arms.

2. The combination of claim 1, wherein said limiting means includes longitudinally extending lugs secured to said brackets adapted to engage the undersurface of said side frame members.

3. The combination of claim 1, wherein said stub axle fastening means includes a transversely extending plate secured to the underside of one of said transverse bars, a sleeve member depending from said plate, and means for removably retaining said stub axles in said sleeve member.

4. The combination of claim 3, wherein said limiting means includes longitudinally extending lugs secured to said brackets adapted to engage the under surface of said side frame members.

5. The combination of claim 1, and a jack carried by said frame rearwardly of said wheels to facilitate the raising and lowering of said trailer frame.

6. The combination of claim 5, and a windlass and cable for operating said jack.

7. The combination of claim 6, wherein said jack has a toggle link operating means, said cable engaging said toggle link.

8. The combination of claim 7, wherein said limiting means includes longitudinally extending lugs secured to said brackets adapted to engage the under surface of said side frame members.

CHARLES S. FOGWELL.

REFERENCES CITED

The following references are of record in the file of this patent:

UNITED STATES PATENTS

| Number | Name | Date |
|---|---|---|
| 2,271,071 | Haber | Jan. 27, 1942 |
| 2,431,388 | Fitzpatrick | Nov. 25, 1947 |

FOREIGN PATENTS

| Number | Country | Date |
|---|---|---|
| 477,423 | Great Britain | Dec. 30, 1937 |